United States Patent
Berlitz et al.

(10) Patent No.: US 10,838,744 B2
(45) Date of Patent: Nov. 17, 2020

(54) WEB COMPONENT DESIGN AND INTEGRATION SYSTEM

(71) Applicant: SAP SE, Walldorf (DE)

(72) Inventors: Eduardo Berlitz, Porto Alegre (BR); Alexandre Faltz, Porto Alegre (BR); Eduardo Carvalho, Rio de Janeiro (BR); Joachim Fitzer, Frankfurt (DE); Reinhold Kautzleben, Karlsruhe (DE); Willian Mendes, São Paulo (BR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/209,144

(22) Filed: Dec. 4, 2018

(65) Prior Publication Data

US 2020/0174800 A1    Jun. 4, 2020

(51) Int. Cl.
| | |
|---|---|
| *G06F 9/44* | (2018.01) |
| *G06F 9/445* | (2018.01) |
| *G06F 8/34* | (2018.01) |
| *G06F 16/957* | (2019.01) |
| *G06F 16/958* | (2019.01) |

(52) U.S. Cl.
CPC ............ *G06F 9/44521* (2013.01); *G06F 8/34* (2013.01); *G06F 9/44584* (2013.01); *G06F 16/9577* (2019.01); *G06F 16/986* (2019.01)

(58) Field of Classification Search
CPC ....................................................... G06F 8/34
USPC ........................................ 717/109, 166, 108
See application file for complete search history.

(56) References Cited

U.S. PATENT DOCUMENTS

| | | | |
|---|---|---|---|
| 7,302,444 | B1 | 11/2007 | Dunmoore et al. |
| 7,949,937 | B2 | 5/2011 | Wu |
| 8,250,457 | B2* | 8/2012 | Fainberg ............. G06F 12/0862 715/205 |
| 8,407,576 | B1* | 3/2013 | Yin ....................... G06F 3/0481 715/206 |
| 8,458,612 | B2* | 6/2013 | Chatterjee ........... G06F 3/04817 715/779 |

(Continued)

OTHER PUBLICATIONS

"Linked Data Reactor: a Framework for Building Reactive Linked Data Applications"—Ali Khalili; Knowledge Representation and Reasoning Research Group Deptartment of Computer Sciences, Vrije Universiteit Amsterdam—2016.*

(Continued)

*Primary Examiner* — Francisco J Aponte
(74) *Attorney, Agent, or Firm* — Sterne, Kessler, Goldstein & Fox P.L.L.C.

(57) ABSTRACT

Disclosed herein are system, method, and computer program product embodiments for providing a web component design and integration system. An embodiment operates by receiving, through an interface, a component file corresponding to adding a first component for a webpage, wherein the component file includes one or more features specific to a first framework. A container corresponding to the first framework is determined, wherein the container comprises one or more functions for accessing the component file, and wherein the one or more functions of the container are operable within a second framework associated with the webpage. A preview of the webpage is generated on the interface including both a visual display of the first component and a visual display of a second component associated with the second framework.

19 Claims, 4 Drawing Sheets

(56) References Cited

U.S. PATENT DOCUMENTS

| | | | |
|---|---|---|---|
| 8,667,090 B2* | 3/2014 | Chhabra | G06F 16/986 |
| | | | 709/219 |
| 9,002,895 B2* | 4/2015 | Doig | G06F 8/34 |
| | | | 707/793 |
| 9,032,390 B2* | 5/2015 | Tsuk | G06F 9/44526 |
| | | | 717/170 |
| 9,116,766 B2* | 8/2015 | Mall | H04L 41/082 |
| 9,235,561 B2 | 1/2016 | Delaporte et al. | |
| 9,424,333 B1 | 8/2016 | Bisignani et al. | |
| 9,471,892 B2 | 10/2016 | Brannlett, Jr. et al. | |
| 9,491,222 B2* | 11/2016 | Shelest | H04L 67/02 |
| 9,760,343 B2* | 9/2017 | Noens | G06F 8/30 |
| 9,857,959 B2* | 1/2018 | Dhawal | G06F 40/14 |
| 9,952,835 B2* | 4/2018 | Wang | G06F 8/34 |
| 10,275,221 B2* | 4/2019 | Thattai | G06F 16/212 |
| 10,402,049 B1* | 9/2019 | Lyman | G06F 17/2235 |
| 10,536,521 B2* | 1/2020 | Haviv | H04L 67/34 |
| 2004/0046789 A1* | 3/2004 | Inanoria | G06F 8/38 |
| | | | 715/748 |
| 2007/0294631 A1 | 12/2007 | Wiseman | |
| 2008/0033876 A1 | 2/2008 | Goldman et al. | |
| 2010/0100802 A1 | 4/2010 | Delaporte et al. | |
| 2011/0107266 A1* | 5/2011 | Hegde | G06F 8/38 |
| | | | 715/841 |
| 2011/0302221 A1 | 12/2011 | Tobin et al. | |
| 2012/0144327 A1* | 6/2012 | Johnson | G06F 3/0486 |
| | | | 715/763 |
| 2012/0324418 A1* | 12/2012 | Fallon | G06F 8/34 |
| | | | 717/101 |
| 2014/0047413 A1* | 2/2014 | Sheive | G06F 8/30 |
| | | | 717/110 |
| 2015/0040103 A1* | 2/2015 | Nyisztor | H04L 41/082 |
| | | | 717/121 |
| 2016/0070813 A1* | 3/2016 | Unter Ecker | G06F 16/958 |
| | | | 715/234 |
| 2016/0110667 A1* | 4/2016 | Clevenger | G06F 8/61 |
| | | | 705/7.23 |
| 2016/0253171 A1* | 9/2016 | Zang | H04L 67/02 |
| | | | 717/101 |
| 2016/0378439 A1* | 12/2016 | Straub | G06F 8/34 |
| | | | 717/107 |
| 2017/0091156 A9* | 3/2017 | Cook | G06F 16/9577 |
| 2017/0154017 A1* | 6/2017 | Kristiansson | G06F 8/60 |
| 2017/0315713 A1* | 11/2017 | Pennell | G06F 3/017 |
| 2017/0344218 A1* | 11/2017 | Jann | G06F 3/04845 |
| 2018/0046602 A1* | 2/2018 | Sisson | G06F 16/972 |
| 2018/0081642 A1* | 3/2018 | Alurralde Iturri | G06F 8/34 |
| 2018/0173390 A1* | 6/2018 | Dunne | G06F 3/0484 |
| 2018/0181270 A1* | 6/2018 | Muramoto | G06F 8/20 |
| 2018/0285328 A1* | 10/2018 | Pivato | G06F 16/958 |
| 2019/0012216 A1* | 1/2019 | Pennell | G06F 9/541 |
| 2019/0057111 A1* | 2/2019 | Chung | G06Q 10/10 |
| 2019/0065153 A1* | 2/2019 | Olsson | G06F 8/34 |
| 2019/0065155 A1* | 2/2019 | Varadarajan | G06F 8/36 |
| 2019/0065156 A1* | 2/2019 | Varadarajan | G06F 8/70 |
| 2019/0065157 A1* | 2/2019 | Varadarajan | G06F 8/35 |
| 2019/0065158 A1* | 2/2019 | Varadarajan | G06F 8/36 |
| 2019/0065159 A1* | 2/2019 | Varadarajan | G06F 8/36 |
| 2019/0095179 A1* | 3/2019 | Straub | G06F 16/182 |
| 2019/0235843 A1* | 8/2019 | Wu | G06F 8/38 |
| 2020/0012743 A1 | 1/2020 | Tucker et al. | |
| 2020/0042578 A1* | 2/2020 | Wu | G06F 16/81 |
| 2020/0133982 A1* | 4/2020 | Thangeswaran | H04L 67/02 |
| 2020/0142660 A1* | 5/2020 | Borkar | H04N 21/4126 |
| 2020/0162359 A1* | 5/2020 | Borkar | H04L 67/20 |
| 2020/0175090 A1 | 6/2020 | Mendes et al. | |

OTHER PUBLICATIONS

Ella Hyvärinen; "Modern Word Press development tools"; Metropolia University of Applied Sciences Bachelor of Engineering Information and Communication Technology Thesis; Mar. 31, 2018.*

Mika Kuitunen; "Cross-Platform Mobile Application Development With React Native"; Faculty of Information Technology and Communication Sciences Bachelor's Thesis; Feb. 2019.*

* cited by examiner

WEB COMPONENT DESIGN AND INTEGRATION SYSTEM

CROSS REFERENCE TO RELATED APPLICATIONS

This application is related to co-pending U.S. patent application Ser. No. 16/209,192, by Mendes et al. "Collaborative Web Application And Data System," filed Dec. 4, 2018 which is hereby incorporated by reference in its entirety.

BACKGROUND

There are a number of different frameworks and languages that a programmer can use to develop or program a webpage. However, programmers face many challenges when developing webpages, including the fact that there are many different frameworks that offer different features, and often the frameworks are not combinable in conventional webpage builders. This limitation forces a programmer to choose a particular framework that may not include all the features the programmer requires for the webpage. As a result, the programmer often has to waste valuable time and computing cycles trying to develop and program workarounds, and compile and debug the new workaround code to obtain the features missing from the selected framework.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing web component design and integration.

Figure 1:
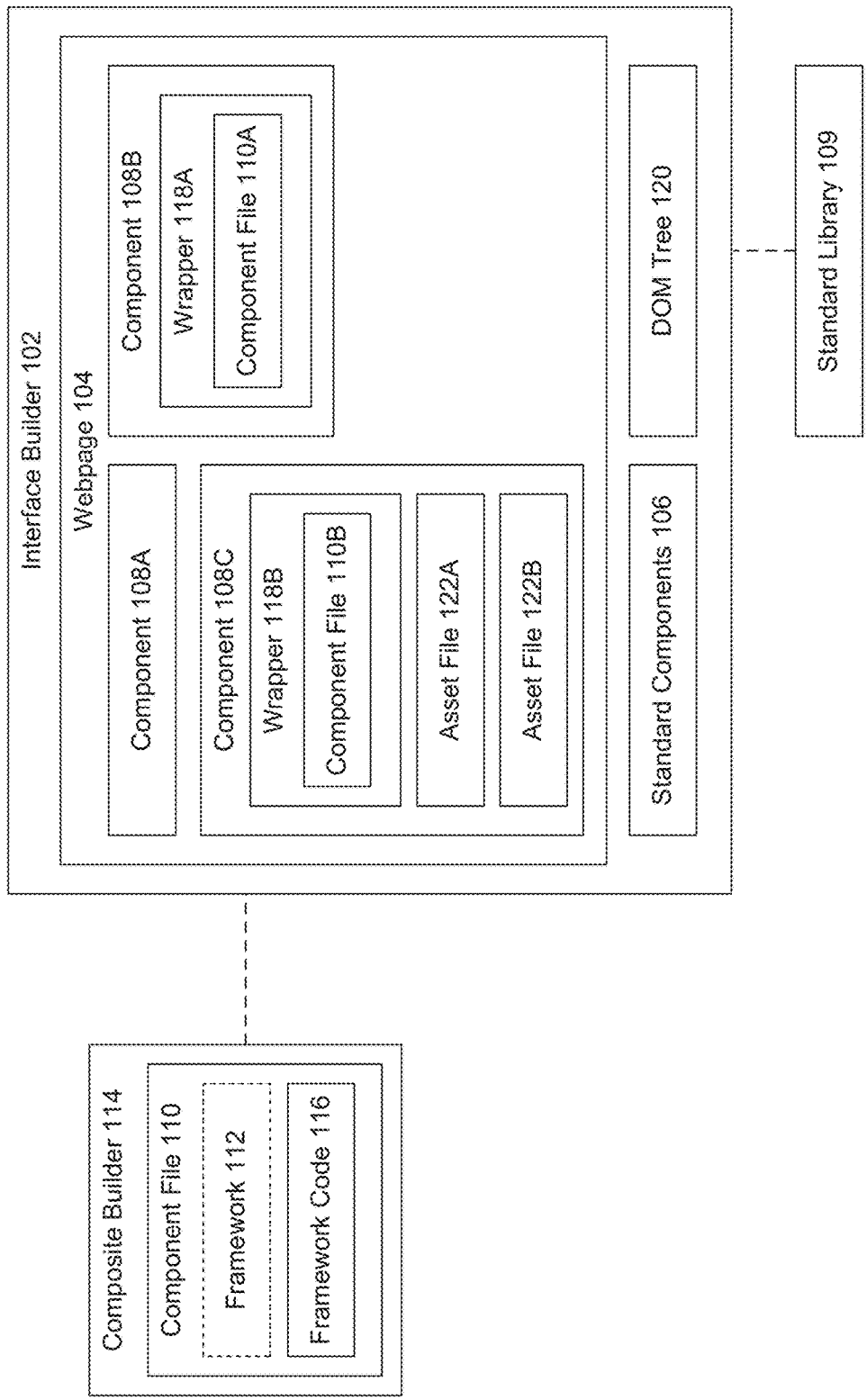
FIG. 1 is a block diagram illustrating example functionality for providing a web component design and integration system, according to some embodiments.

FIG. 1 is a block diagram 100 illustrating example functionality for providing a web component design and integration system, according to some embodiments. The system of FIG. 1 may include an interface builder 102 that enables a programmer, developer, administrator, or other user to design a webpage 104.

Webpage 104 may include any document, program, or application that is executable by or configured for display within a web browser. In an embodiment, webpage 104 may include hypertext markup language (HTML) included in a document object model (DOM). In an embodiment, the DOM may call or include references to functions that are written in various computing languages, such as JavaScript® functions. JavaScript® is an example technology that enables webpage pages to be interactive, and may support both event-driven functional and object-oriented programming. A server may provide the HTML code and JavaScript® functions, which may be executed across a plurality of browsers or user devices to generate web page 104 or instances thereof based on a DOM corresponding the HTML document or code.

Interface builder 102 may be a tool or program that enables a user to visually design webpage 104. Interface builder 102 may include a set of standard components 106, built using a particular selected, default, or standard framework or library 109. Interface builder 102 may enable a user to drag-and-drop standard components 106 for use in designing webpage 104.

As such, interface builder 102 simplifies the webpage building process by using preconfigured components, requiring less development time may use fewer computing cycles than would otherwise be required to build and debug each component from scratch. In an embodiment, interface builder 102 may enable a user to customize the standard components 106 to meet their specific needs.

Figure 2:
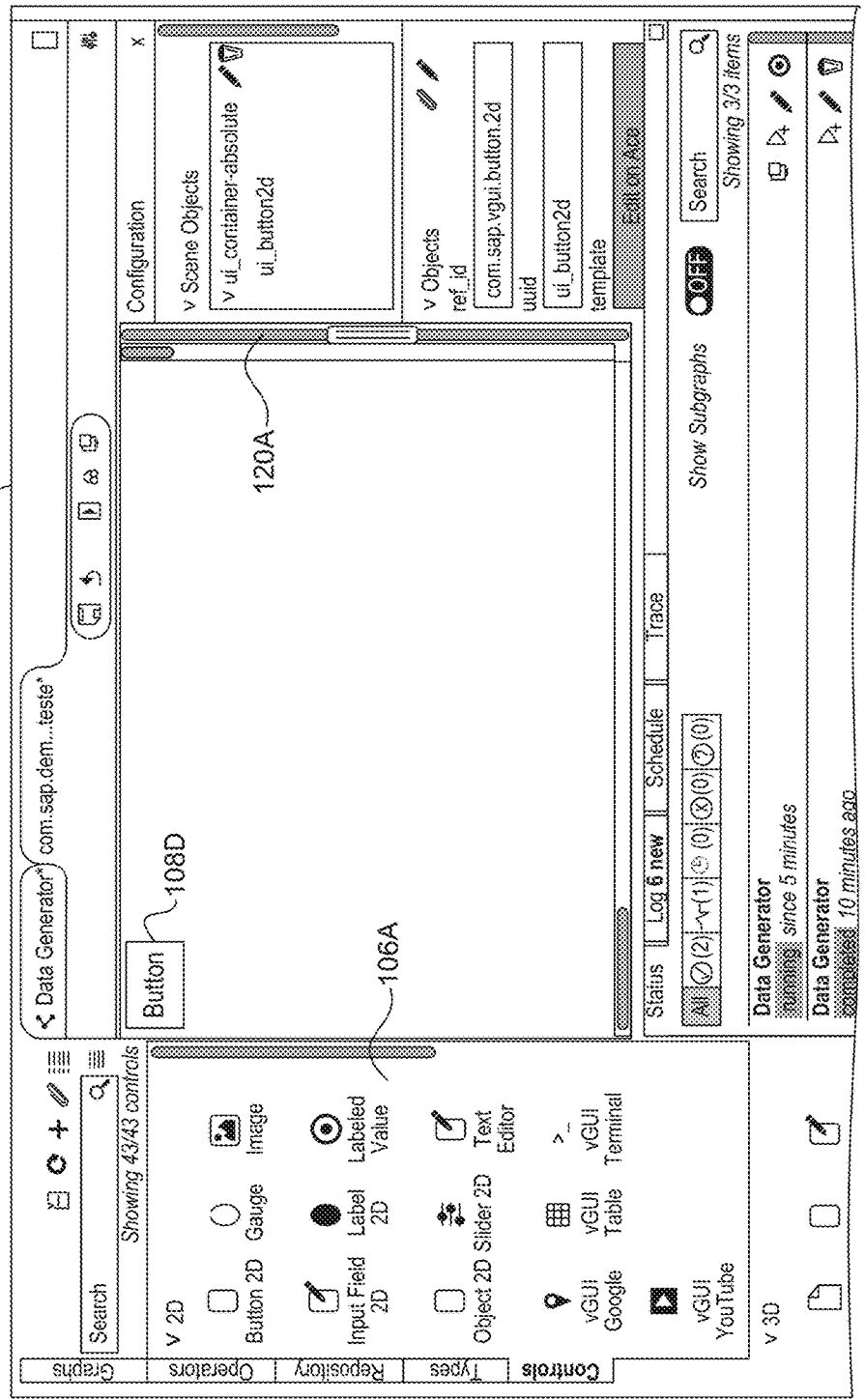
FIG. 2 is an example interface builder user interface for providing web component design and integration functionality, according to some embodiments.

FIG. 2 is an example illustration 200 of an interface builder graphic user interface (GUI) 102A for providing web component design and integration functionality, according to some embodiments. For example, as described above, interface builder 102A may enable a user to drag-and-drop standard components 106 from a standard components portion of the interface onto an interface view portion of the interface. In the example illustrated in FIG. 2, a button component 108D has been dragged onto the view portion of the interface for inclusion or display in a webpage 104.

In various embodiments, button component 108D may be an example of a standard component 108A or may be an example of a non-standard or user customized component (108B, 108C), as discussed in greater detail below. One of the differences between standard components 108A and non-standard components 108B, 108C may depend on which framework they are built, or which library they reference.

Returning to FIG. 1, standard components 106 may reference or use the features of a standard library 109. Standard library 109 may include a framework or set of preconfigured or precompiled functions, objects, images, or other data constructs that may be used or referenced by standard components 106. In an embodiment, standard library 109 may include a particular, selected, or preconfigured JavaScript® framework.

Interface builder 102 may enable a user to design or configure their own components using additional frameworks or libraries different from standard library 109. For example, if a user is building webpage 104, and the component they want to add to webpage 104 is not included in standard components 106, interface builder 102 provides functionality that enables the user to create or import their own custom component 108B, 108C using any framework 112, including but not limited to standard library 109.

As such, the user does not have to choose one framework to use with all of the visual or user interface components of a particular webpage 104. Instead, interface builder 102 enables the user to select and use features across multiple different frameworks. By enabling compatibility across different frameworks 112, interface builder 102 may reduce the amount of time and computing cycles required to design a webpage 104 or a plurality of webpages 104.

For example, rather than being limited to a single framework and having to program, debug, and compile functionality not a part of the selected framework, interface builder 102 allows access to features and components in any framework, including but not limited to standard library 109. This means the user does not have to re-code, debug, and compile interface features or components that already exist across different frameworks. Interface builder 102 enables the user to pick and choose which combinations of frameworks 112 are best suited for which components within a single webpage 104, or across different webpages 104 of a website (e.g., collection of linked or related webpages).

Framework 112 may be a software or programming framework that supports the development of webpages or web applications. Framework 112 may provide a standard way to build and deploy a particular web application, and may automate the overhead associated with common activities performed in web development. For example, framework 112 may include a set of built-in functionality, images, or other features, a user may use to design or configure a custom component 108B, 108C.

Example frameworks 112 include, but are not limited to, React, Angular, OpenUI5, Backbone, Dojo, Ember, Enyo, jQuery, Knockout, and Wakanda, to name just some examples. Framework 112 may include generic functionality that may be selectively changed by user written code. For example, each framework 112 may include function calls, programming constructs, references, or other features (including libraries) that are specific to that framework and are not included or executable in another or different framework. However, particular frameworks 112 may also include features that are compatible across multiple or different frameworks 112.

Throughout this description, while JavaScript® is referred to with regard to standard library 109 and frameworks 112, it should be understood that other embodiments may include languages and frameworks and are not limited to JavaScript®. Standard library 109 may include a selection of one or more available frameworks 112.

In an embodiment, components 108 (A-C) may include any visual or user interface component that may be added to a webpage 104, Example components 108 include, but are not limited to, buttons, charts, checkboxes, tables, videos, text boxes, text editors, images, 3D (three-dimensional) objects, and virtual-reality (VR) or augmented reality (AR) images, to name just some examples. In the example illustrated, component 108A may be a standard component 106 based on standard library 109, while components 108B and 108C may be custom built or user configured components using one or more frameworks 112 other than standard library 109.

In an embodiment, interface builder 102 may enable a user to upload a component file 110. Component file 110 may be a pre-configured or pre-compiled file that is compatible with webpage 104 or otherwise executable by a web browser. In an example embodiment, component file 110 may include a JavaScript® file that has been written in a framework 112 other than standard library 109. Component file 110 may include or import the code and references from framework 112 that may be necessary for its execution. In an embodiment, component files 110 may be debugged and compiled prior to upload into interface builder 102.

A component builder 114 may include an application or program that enables a user to program, debug, and compile framework code 116. Framework code 116 may include any web or browser compatible code that is written using a specific set of libraries or framework 112, such as JavaScript®. Upon a successful debug and compilation of framework code 116, component builder 114 may generate a component file 110.

Component file 110 may be an encoded data file that includes both framework code 116 (which has been checked for syntax errors) and features, functions, or code from framework 112 in an encapsulated file structure. Component file 110 may be executable by a web browser or other program. In an embodiment, component file 110 may be a JSON (JavaScript Object Notation) file that is accessible or modifiable using a text editor.

When designing a new component 108B, 108C using interface builder 102, a user may upload or provide a reference (memory or web address) to a pre-compiled component file 110 using a framework 112 other than standard library 109. By enabling a user to upload or import a pre-compiled component file 110, interface builder 102 may save local processing cycles that would otherwise be used or required in debugging and compiling the previously compiled framework code 112. In another embodiment, interface builder 102 may include component builder 114 functionality such that a user may design, program and compile a component file 110 directly from interface builder 102.

Upon receiving a selection, or upload of a component file 110A, 110B, interface builder 102 may receive a wrapper 118A, 118B for the respective component file 110. Wrapper 118 may include metadata or program code written in a computing language that is compatible with interface builder 102, webpage 104, or standard library 109, and is not exclusive to framework 112. For example, framework code 116 may be JSX (JavaScript eXtension) which may be an extension to the JavaScript computing language in the React framework 112, while wrapper 118 may include simple or universal JavaScript code which does not use any React-specific code, references, libraries, or functions.

In an embodiment, interface builder 102 may enable a user to directly program or upload wrapper 118. Wrapper 118 may enable compatibility between component file 110 and interface builder 102 or webpage 104, without requiring framework code 116 to be changed. As such, a custom built component file 110 may be repeatedly used with different wrapper files 118. In an embodiment, wrapper 118 may include one or more subroutines which are called enabling the integration of component file 110 with a native application or interface.

Wrapper 118 may provide interface builder 102 with the information necessary to execute component 108 and organize the component within a DOM (document object model) tree 120. In an embodiment, wrapper 118 may include definitions for various functionality including, but not limited to, getControl, insert, and remove functions. The getControl function may include code that defines the component instance or element that is used when it is rendered on an active webpage 104, or may include code that indicates what happens when a user selects a particular button or table.

DOM may include a cross-platform, language independent application programming interface (API) that treats an HTML or XML (extensible markup language) document as a tree structure 120 in which each node may represent a part of the (HTML) document, The insert and remove functions may provide interface builder 102 with the necessary information to insert and remove the customized or user-configured components 108B, 108C in DOM tree 120. In an embodiment, a user may update or customize a default set of insert and remove functions when the component is not a pure DOM element (such as a JavaScript® file, 3D object, or UI5 component).

FIG. 2 illustrates an example DOM tree 120A. DOM tree 120A may include a visual illustration of an organization of a DOM of webpage 104. Each node in DOM tree 120A may represent a part of DOM. For example, the ui_container-absolute node may include a container component that includes insert and remove wrapper 118 functionality for the Open UI or UI5 framework 112. As illustrated, under the UI container is the component code for the button 108D, which may include getControl code.

Interface builder 102A may maximize reuse and minimize how much code must be stored and executed by providing container classes. For example, interface builder 102A may reuse the ui_container-absolute container for any subsequently added UI5 components. As such, interface builder 102A enables multiple different components 108B, 108C to reuse the same container class 110 if they belong to or reference the same framework 112, thus saving debug and compile time, and memory overhead that would otherwise be required to store the same code multiple times. In another embodiment, a programmer may provide multiple container classes or wrappers 118 for the same framework 112.

Returning to FIG. 1, when creating components 108B, 108C, interface builder 102 may enable the user or programmer to specify which existing container class a particular component 108 belongs. For example, a user may select existing container classes from a drop-down list. Or, for example, the user may select an option to create a new container class for a new framework 112.

After creating the custom component 108B, 108C, interface builder 102 may provide or make available the set of custom components in interface builder 102. Then, similar to preconfigured standard components 106, users may drag-and-drop the custom components from the component section of interface builder 102 into the webpage builder portion of the interface. From the pre-configured information, interface builder 102 may identify and automatically load the corresponding container and wrapper 118 information, and organize the DOM tree 120 (representing the DOM of webpage 104), without further user specification.

In an embodiment, interface builder 102 may provide, in real-time, a visual preview of custom components in webpage 104 by executing component file 110, or portions thereof that may indicate the visual appearance component 108B, 108C. Through the webpage builder of the interface, a user may then adjust visual features such as size, shape, and color of the various components 108.

In an embodiment, a custom component 108C may also include references to asset files 122A, 122B. Asset files 122 may include any files, other than component file 110, which are referenced by framework code 116 or may be used to execute or display component 108C. Example asset files 122 include images, tables, data references, CSS (cascading style sheet), JavaScript®, or other files. Interface builder 102 may enable a user to upload asset files 122 while creating or modifying component 108C.

Figure 3:
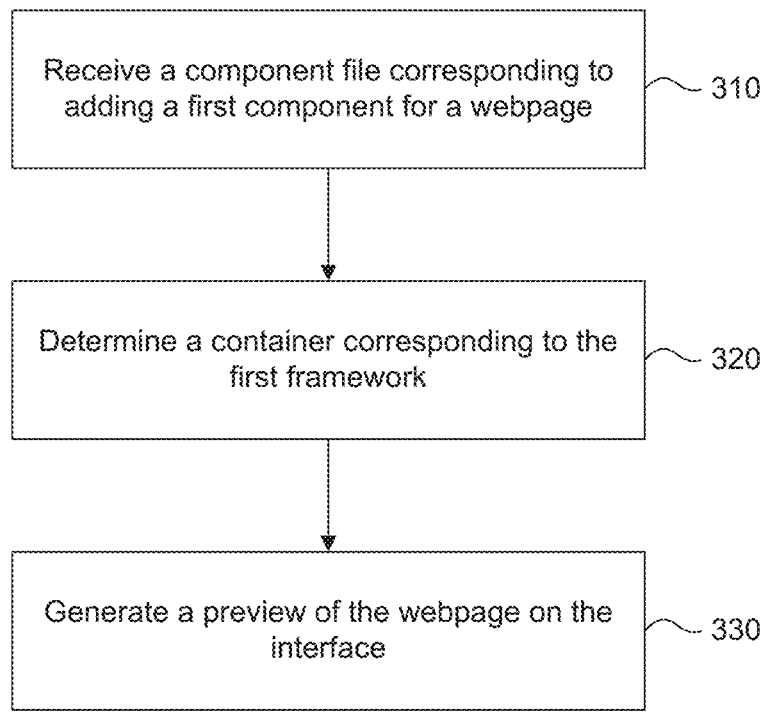
FIG. 3 is a flowchart illustrating example operations of a web component design and integration system, according to some embodiments.

FIG. 3 is a flowchart 300 illustrating example operations of a web component design and integration system, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIGS. 1 and 2. However, method 300 is not limited to those example embodiments.

In 310, a component file corresponding to adding a first component for a webpage is received. For example, interface builder 102 may receive component files 110B, 110C for adding custom components 108B, 108C to webpage 104. Each component files 110 may include features specific to its own framework 112. In an embodiment, one framework 112 may be React, and another may be Angular. However, standard library 109 may not include the React or Angular specific features included in the component files 110.

In 320, a container corresponding to the first framework is determined. For example, interface builder 102 may receive wrapper 118A for component file 110A. As illustrated in the example of FIG. 2, in DOM tree 120A, the ui_container-absolute may correspond to wrapper 118A, and may include code for functionality associated with components of the UI framework. In an embodiment, wrapper 118A may include getControl, insert, and remove functionality, that enables interface builder to access and/or organize component file 110A within a DOM of webpage 104. Wrapper 118A may include general JavaScript® code that is interoperable across different frameworks 112, including standard library 109, and is not specific to any one framework 112.

In 330, a preview of the webpage is generated on the interface. For example, as illustrated in FIG. 2, button 108D may be generated in a preview of webpage 104. In an embodiment, interface builder 102 may execute component file 110 to generate the preview of a custom component 108. Interface builder 102A may allow a user to visually manipulate the size, color, shape, text, and other visual features of component 108D within the preview and webpage builder portion of the visual interface.

Figure 4:
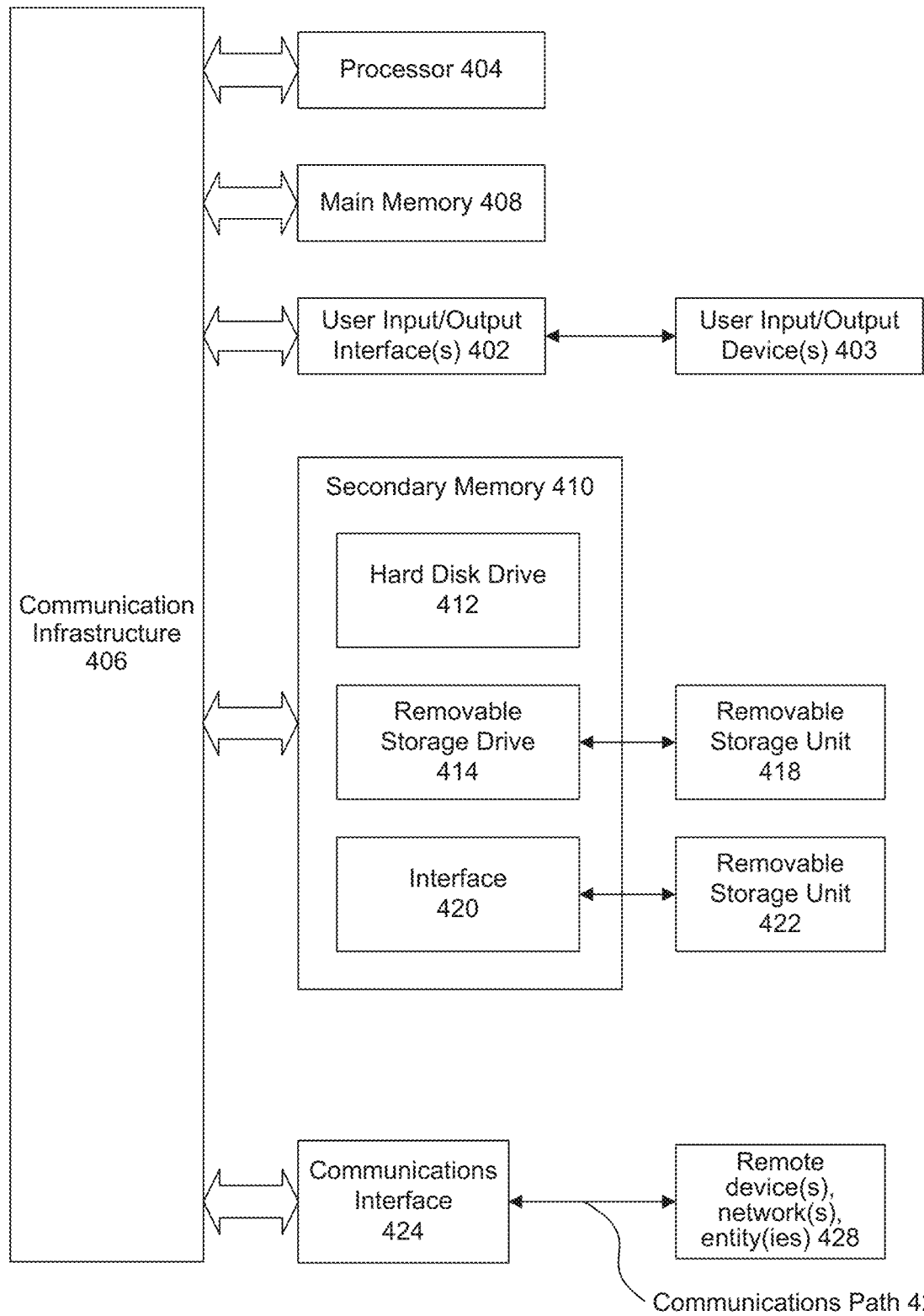
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may he connected to a communication infrastructure or bus 406.

Computer system 400 may also include customer input/output device(s) 403, such as monitors, keyboards, pointing devices, etc., which may communicate with communication infrastructure 406 through customer input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/ any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not n direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
receiving, through an interface, a component file corresponding to adding a first component for a webpage, wherein the component file includes one or more features specific to a first framework;
determining a container corresponding to the first framework, wherein the container comprises one or more functions for accessing the component file, and wherein the one or more functions of the container are operable within a second framework associated with the webpage;
receiving, through the interface, a selection of a third component corresponding to the container and associated with the first framework;
adding the third component to the container;
receiving a wrapper for the container, wherein the wrapper is used for both the first component and the third component, wherein the wrapper includes code operable across both the first framework and the second framework;
generating, on the interface, a preview of a document object model of the webpage on the interface including a visual display of the first component and third components under the container, and a visual display of a second component associated with the second framework.

2. The method of claim 1, wherein the component file includes code executable within the first framework, but not executable within the second framework.

3. The method of claim 2, wherein the component file is compiled prior to being received.

4. The method of claim 1, wherein the container comprises code that executable within the second framework.

5. The method of claim 1, wherein the first component includes JavaScript® code in a React framework, and wherein the container includes the one or more functions written in a JavaScript® framework other than React.

6. The method of claim 1, further comprising:
adding the first component to a set of pre-configured components, available for dragging and dropping into the webpage based on the received component file.

7. The method of claim 1, further comprising:
generating a visual display of a document object model (DOM) tree in the interface, the DOM tree representing a structure of the webpage including the first framework and the second framework.

8. The method of claim 1, wherein the wrapper enables compatibility between the component file and the webpage on both the first framework and the second framework.

9. A system, comprising:
a memory; and
at least one processor coupled to the memory and configured to:
receive, through an interface, a component file corresponding to adding a first component for a webpage, wherein the component file includes one or more features specific to a first framework;
determine a container corresponding to the first framework, wherein the container comprises one or more functions for accessing the component file, and wherein the one or more functions of the container are operable within a second framework associated with the webpage;
receive, through the interface, a selection of a third component corresponding to the container and associated with the first framework;
add the third component to the container;
receive a wrapper for the container, wherein the wrapper is used for both the first component and the third component, wherein the wrapper includes code operable across both the first framework and the second framework;
generate, on the interface, a preview of a document object model of the webpage on the interface including a visual display of the first component and third components under the container, and a visual display of a second component associated with the second framework.

10. The system of claim 9, wherein the component file includes code executable within the first framework, but not executable within the second framework.

11. The system of claim 10, wherein the component file is compiled prior to being received.

12. The system of claim 9, wherein the container comprises code that executable within the second framework.

13. The system of claim 9, wherein the first component includes JavaScript® code in a React framework, and wherein the container includes the one or more functions written in a JavaScript® framework other than React.

14. The system of claim 9, wherein the at least one processor is further configured to:
add the first component to a set of pre-configured components, available for dragging and dropping into the webpage based on the received component file.

15. The system of claim 9, wherein the at least one processor is further configured to:
generate a visual display of a document object model (DOM) tree in the interface, the DOM tree representing a structure of the webpage including the first framework and the second framework.

16. A non-transitory computer-readable device having instructions stored thereon that, when executed by at least one computing device, cause the at least one computing device to perform operations comprising:
receiving, through an interface, a component file corresponding to adding a first component for a webpage, wherein the component file includes one or more features specific to a first framework;
determining a container corresponding to the first framework, wherein the container comprises one or more functions for accessing the component file, and wherein the one or more functions of the container are operable within a second framework associated with the webpage;
receiving, through the interface, a selection of a third component corresponding to the container and associated with the first framework;
adding the third component to the container;
receiving a wrapper for the container, wherein the wrapper is used for both the first component and the third component, wherein the wrapper includes code operable across both the first framework and the second framework;

generating, on the interface, a preview of a document object model of the webpage on the interface including a visual display of the first component and third components under the container, and a visual display of a second component associated with the second framework.

17. The non-transitory computer-readable device of claim 16, wherein the component file includes code executable within the first framework, but not executable within the second framework.

18. The non-transitory computer-readable device of claim 17, wherein the component file is compiled prior to being received.

19. The non-transitory computer-readable device of claim 16, wherein the container comprises code that executable within the second framework.

* * * * *